(12) United States Patent
Dahl

(10) Patent No.: US 9,953,491 B2
(45) Date of Patent: *Apr. 24, 2018

(54) SYSTEM AND METHOD FOR CONDUCTING A GAME INCLUDING A COMPUTER-CONTROLLED PLAYER

(71) Applicant: BRAIN GAMES, L.C., Dallas, TX (US)

(72) Inventor: Fredrik A. Dahl, Loerenskog (NO)

(73) Assignee: Brain Games, L.C., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/293,593

(22) Filed: Oct. 14, 2016

(65) Prior Publication Data

US 2017/0032623 A1 Feb. 2, 2017

Related U.S. Application Data

(63) Continuation of application No. 14/919,549, filed on Oct. 21, 2015, now abandoned, which is a continuation of application No. 14/253,320, filed on Apr. 15, 2014, now abandoned, which is a continuation of application No. 13/920,943, filed on Jun. 18, 2013, now Pat. No. 8,696,446, which is a continuation of application No. 13/628,689, filed on Sep. 27, 2012, now abandoned, which is a continuation of application No. 13/031,434, filed on Feb. 21, 2011, now Pat. No. 8,430,744, which is a
(Continued)

(51) Int. Cl.
G07F 17/32 (2006.01)
G06Q 20/20 (2012.01)
A63F 13/67 (2014.01)

(52) U.S. Cl.
CPC .......... *G07F 17/3293* (2013.01); *A63F 13/67* (2014.09); *G06Q 20/202* (2013.01); *G07F 17/32* (2013.01); *G07F 17/3262* (2013.01); *G07F 17/3276* (2013.01); *G07F 17/3288* (2013.01)

(58) Field of Classification Search
USPC ...................................... 463/25, 21
See application file for complete search history.

(56) References Cited

U.S. PATENT DOCUMENTS 7,452,273 B2 * 11/2008 Amaitis .................... A63F 1/06 463/1
2004/0248632 A1 * 12/2004 French ............... A63B 24/0003 463/4

(Continued)

*Primary Examiner* — Pierre E Elisca
(74) *Attorney, Agent, or Firm* — Munck Wilson Mandala, LLP

(57) ABSTRACT

A system and method for conducting a game between at least one live player and at least one computer-controlled player includes executing a training program between at least two agents to generate probability weights correlating actions or meta-actions representing a set or sequenced set of actions with a probability that the action or meta-action will produce a game outcome meeting a specified criterion or specified criteria. A game is conducted in which at least one live player plays against at least one computer-controlled player in which the computer-controlled player selects actions at one or more of the decision nodes in the game based, at least in part, on the probability weights.

20 Claims, 8 Drawing Sheets

Related U.S. Application Data continuation of application No. 11/810,827, filed on Jun. 7, 2007, now Pat. No. 7,892,080.

(60) Provisional application No. 60/862,628, filed on Oct. 24, 2006.

(56) References Cited

U.S. PATENT DOCUMENTS

| | | | |
|---|---|---|---|
| 2006/0211462 A1* | 9/2006 | French | A63B 24/0003 463/1 |
| 2007/0066403 A1* | 3/2007 | Conkwright | A63F 13/10 463/43 |

* cited by examiner

SYSTEM AND METHOD FOR CONDUCTING A GAME INCLUDING A COMPUTER-CONTROLLED PLAYER

CROSS-REFERENCE TO RELATED APPLICATIONS

This application is a continuation of U.S. patent application Ser. No. 14/919,549, filed Oct. 21, 2015, as U.S. Publication No. 2016-0180655, entitled SYSTEM AND METHOD FOR CONDUCTING A GAME INCLUDING A COMPUTER-CONTROLLED PLAYER, which is a continuation of U.S. patent application Ser. No. 14/253,320, filed Apr. 15, 2014, published on Oct. 23, 2014, as U.S. Publication No. 2014-0315625, entitled SYSTEM AND METHOD FOR CONDUCTING A GAME INCLUDING A COMPUTER-CONTROLLED PLAYER. Application Ser. No. 14/253,320 is a continuation of U.S. patent application Ser. No. 13/920,943, filed Jun. 18, 2013, published on Oct. 24, 2013, as U.S. Publication No. 2013-0281195, now U.S. Pat. No. 8,696,446, issued on Apr. 15, 2014, entitled SYSTEM AND METHOD FOR CONDUCTING A GAME INCLUDING A COMPUTER-CONTROLLED PLAYER. Application Ser. No. 13/920,943 is a continuation of U.S. patent application Ser. No. 13/628,689, filed Sep. 27, 2012, published on Apr. 11, 2013, as U.S. Publication No. 2013-0090153, entitled SYSTEM AND METHOD FOR CONDUCTING A GAME INCLUDING A COMPUTER-CONTROLLED PLAYER. Application Ser. No. 13/628,689 is a continuation of U.S. patent application Ser. No. 13/031,434, filed Feb. 21, 2011, published on Dec. 8, 2011, as U.S. Publication No. 2011-0300924, now U.S. Pat. No. 8,430,744, issued Apr. 30, 2013, entitled SYSTEM AND METHOD FOR CONDUCTING A GAME INCLUDING A COMPUTER-CONTROLLED PLAYER. Application Ser. No. 13/019,792, filed Feb. 2, 2011, entitled SYSTEM AND METHOD FOR CONDUCTING A GAME INCLUDING A COMPUTER-CONTROLLED PLAYER is a continuation of U.S. patent application Ser. No. 11/810,827. Application Ser. No. 13/031,434, is a continuation of U.S. patent application Ser. No. 11/810,827, filed Jun. 7, 2007, entitled SYSTEM AND METHOD FOR CONDUCTING A GAME INCLUDING A COMPUTER-CONTROLLED PLAYER, now U.S. Pat. No. 7,892,080, issued on Feb. 22, 2011. Application Ser. No. 11/810,827 claims benefit of U.S. Provisional Application Ser. No. 60/862,628, filed Oct. 24, 2006, entitled PROGRAM FOR PLAYING TWO-PLAYER TEXAS HOLD'EM. The specifications of U.S. Pat. Nos. 8,696,446, 8,430,744, and 7,892,080; and Patent Application Publication Nos. 2014-0315625, 2013-0281195, 2013-0090153, and 2011-0300924, are hereby incorporated by reference in their entirety.

TECHNICAL FIELD

The present invention relates to methods and systems for conducting a game. More particularly, the present invention is a system and method for conducting a game, such as the casino card game of poker, including at least one computer-controlled player playing against at least one live player.

BACKGROUND

The game of poker presents a serious challenge to artificial intelligence research. Uncertainty in the game stems from partial information, unknown opponents, and game dynamics dictated by a shuffled deck. Add to this the large space of possible game situations in real poker games such as Texas Hold'em, and the problem becomes very difficult indeed. Human players, and even the best computer players, are certainly not optimal in that idiosyncratic weaknesses associated with the human or computer players can be exploited to obtain higher pay offs as compared to an approximating approach utilizing linear programming techniques.

Existing approaches to opponent modeling have employed a variety of approaches including reinforcement learning, neural nets and frequent statistics. Additionally, earlier work on using Bayesian models for poker has attempted to classify the opponent's hand into one of a variety of broad hand classes. They did not model uncertainty in the opponent's strategy, utilizing instead an explicit strategy representation. This strategy was updated based on empirical frequencies at play, but these models showed little improvement due to this updating. Other systems utilized Bayesian probabilistic models for Hold'em poker games wherein the uncertainty in the game and the opponent was completely modeled.

In certain circumstances and in certain games, it is desirable to decrease the element of skill element and increase the chance element. For example, when a game such as poker is implemented as a house-banked game, such as in a gaming machine, it may be desirable that the game be a game where chance, rather than skill, is a factor in determining the outcome. That is, where a game is implemented in a gaming machine, the player competes against the gaming machine. If the gaming machine adapts to the player's skill, then this arguably becomes a game of skill and may not be desirable for two reasons. First, the gaming machine would arguably play "too well" and only expert players or players who are exceptionally fortunate would have a chance to win against the gaming machine. Second, under some states' gaming regulations, games of skill are only allowed when the game is "player-banked" and only non-casino, human players are competing against one another. Thus, casino poker is typically played in poker rooms in which multiple players each contribute to a pot. The pot, minus a "rake" retained by the house for hosting the game, is awarded to the winning player.

Among the problems in modeling poker play are the large number of unknowns, such as the cards that have not been dealt at any point in the game, and the multiple options available to a player at various points in the game. Another unknown is the role of "bluffing" by a player.

For example, in a typical hand of Texas Hold'em poker, a single game consists of a number of stages separated by decision nodes where a decision must be made by a player. At a first stage, the pot is seeded. In one embodiment, a blind bet is placed by at least one player. In alternate embodiments, multiple blind bets, e.g. a small blind and a large blind, are received from different players. Optionally, the blind bet(s) rotates among players. In an alternate or additional optional embodiment, each participating player may place an ante wager. The blind bet(s) and/or ante wagers are aggregated to a pot and each player is dealt a hand of cards.

In conventional Texas Hold'em, the hand consists of two cards. This is typically followed by a round of betting. In a typical game of Texas Hold'em, the actions available to a player are to: (a) fold, e.g. terminate play by the player; (b) bet or check, if no other player has previously placed an additional wager, or call, if another player has previously placed an additional wager; or (c) raise, if another player has placed an additional wager and the player wishes to increase the amount of the additional wager. Bets, calls, and raises are aggregated to the pot. In some versions, the number of raises, as well as the size of the bets and raises, is limited.

Additional stages are conducted in which community cards available to all the players on constructing the player's final hand are revealed. In conventional Texas Hold'em, a total of five community cards are revealed in three stages, with each stage followed by a round of betting. As known in the art, three cards (referred to as the "flop") are revealed in a stage, one card (referred to as the "turn") is revealed in an ensuing stage, and one card (referred to as the "river") is revealed in a later ensuing stage. If players fold thereby leaving only one active player, the active player wins. If more than one player remains in the game through the revelation of all the community cards and the rounds of betting, each player forms a final hand using five of the seven cards (two in the player's hand plus five community cards) available to the player. The final hands are compared, and at least a portion of the pot is awarded to the player with the highest ranking poker hand.

SUMMARY

The present invention includes systems and methods for conducting a game. According to an embodiment of the present invention, a system is provided for conducting a game between a computer-controlled player and at least one live player. In one such optional embodiment, the game includes at least two decision nodes at which a decision is made. The game produces a game outcome such as, for example, a determination of which of the computer-controlled player(s) and live player(s) won the game. In an optional embodiment, the live player(s) and computer-controlled player(s) place one or more wagers and the game outcome is used to resolve the wagering.

The system includes a data processor. A data storage communicates with the data processor. The data storage stores instructions executable by the data processor, including a training program. The training program conducts the game among two or more agents controlled by the data processor to select actions at the decision nodes to produce game outcomes. In a further optional embodiment, meta-actions are used in selecting actions at the decision nodes. In one optional embodiment, each meta-action represents a set of one or more actions. In a further optional embodiment, each meta-action represents a sequence of two or more actions.

The training program evaluates the game outcomes based on one or more predetermined criteria. In one optional embodiment, the actions include at least one wagering decision such that the game outcome includes a win or loss of wagers. In one such optional embodiment, the predetermined criteria for evaluating the game outcomes include a minimization of the maximum loss.

Based on the evaluation of the game outcomes produced in the games conducted between or among agents, the training program constructs probability weights associating sets of one or more of the actions with a probability that the predetermined criteria will be met as a result of the set of one or more actions. In an optional embodiment, the training program may include a neural net adapted to increase the probability that actions leading to a game outcome meeting the predetermined criteria will be selected and decrease the probability that actions leading to a game outcome not meeting the predetermined criteria will be selected.

A system also includes a gaming device. The gaming device includes a gaming device processor, a gaming device interface in communication with the gaming device processor, and a gaming device data storage in communication with the gaming device processor. The gaming device data storage stores instructions executable by the gaming device processor to conduct the game. The instructions include a game program that receives input including a wager from the live player through the gaming device interface. The game could take any form. For example, in an optional embodiment, the game conducted by the training program and the game program is a game in which at least one of the actions at one or more of the decision nodes includes a wagering action to place an additional wager. Similarly, the training program and game program could conduct a game in which at least one of the actions at one or more of the decision nodes includes a fold action to terminate conduct of the game.

In one optional embodiment, the gaming machine data storage stores the probability weights; in another optional embodiment, the system includes a database storage device communicating with the gaming machine to store the probability weights. The game program conducts the game to produce a game outcome by controlling the computer-controlled player against the live player. The computer-controlled player selects at least one action at one or more of the decision nodes based, at least in part, on the probability weights. In an optional embodiment, the game program controls the computer-controlled player to select meta-actions in the form of a set of one or more actions, or a sequence of two or more actions, at one or more of the decision nodes based, at least in part, on the probability weights. Optionally, the selection is a weighted random selection in which the selection of an action or meta-action is random based on the probability weights. In an optional embodiment, each decision node in the game includes the same actions available to the computer-controlled player and the live player.

The game program evaluates the game outcome and resolves the wager. For example, in one optional embodiment, the game is a poker game in which the wager is contributed to a pot, the game outcome is determined by which of the computer-controlled player and live player wins the poker game, and at least a portion of the pot is distributed to the live player if the live player wins the poker game.

In an optional embodiment, the game program reconstructs the probability weights such that game outcomes produced by the gaming device alter the probability weights. In another optional embodiment, the training program fixes the probability weights such that the game outcomes produced by the gaming device leave the probability weights unaltered.

A method according to the present invention is directed to conducting a game between a computer-controlled player and at least one live player. As above, the game includes at least two decision nodes at which a decision is made to select one or more actions to produce a game outcome.

Probability weights are generated. In an optional embodiment, multiple iterations of the game are conducted among two or more agents controlled by a data processor. Each iteration uses a meta-action representing a sequence of two or more of the actions at the decision nodes to produce game outcomes. The game outcomes are evaluated based on one or more predetermined criteria. For example, in an optional embodiment, the actions include a wagering action such that the game outcome includes a win or loss of wagers, and the predetermined criteria include a minimization of the maximum loss. Optionally, the training program trains a neural net by increasing the probability that actions leading to a game outcome meeting the predetermined criteria will be selected and decreasing the probability that actions leading to a game outcome not meeting the predetermined criteria will be selected.

Meta-actions are associated with probability weights that the predetermined criteria will be met as a result of the meta-actions. In an optional embodiment, the probability weights are fixed such that the game outcomes produced while conducting the game leave the probability weights unaltered.

The game is conducted. Input, including a wager, is received from the live player. A game outcome is produced by controlling the computer-controlled player against the live player. In an optional embodiment, a game is conducted in which each decision node includes the same actions available to the computer-controlled player and the live player. The computer-controlled player selects at least one action at one or more of the decision nodes randomly based, at least in part, on the probability weights. In an optional embodiment, the computer-controlled player selects one or more meta-actions in the form of a set of one or more actions, or a sequence of two or more actions, based on the probability weights. The game actions could take any form. For example, in an optional embodiment, at least one of the actions at one or more of the decision nodes includes a wagering action to place an additional wager. In another optional embodiment, at least one of the actions at one or more of the decision nodes includes a fold action to terminate conduct of the game.

The game outcome is evaluated and the wager is resolved. In an optional embodiment, the probability weights are reconstructed such that game outcomes produced while conducting the game alter the probability weights.

For example, in an optional embodiment, the game is a poker game in which the wager is contributed to a pot. The game outcome is determined by which of the computer-controlled player and live player wins the poker game. At least a portion of the pot is distributed to the live player if the live player wins the poker game. If the computer-controlled player wins the poker game, the computer-controlled player (such as through a gaming machine) retains at least a portion of the pot.

DETAILED DESCRIPTION

Figure 1:
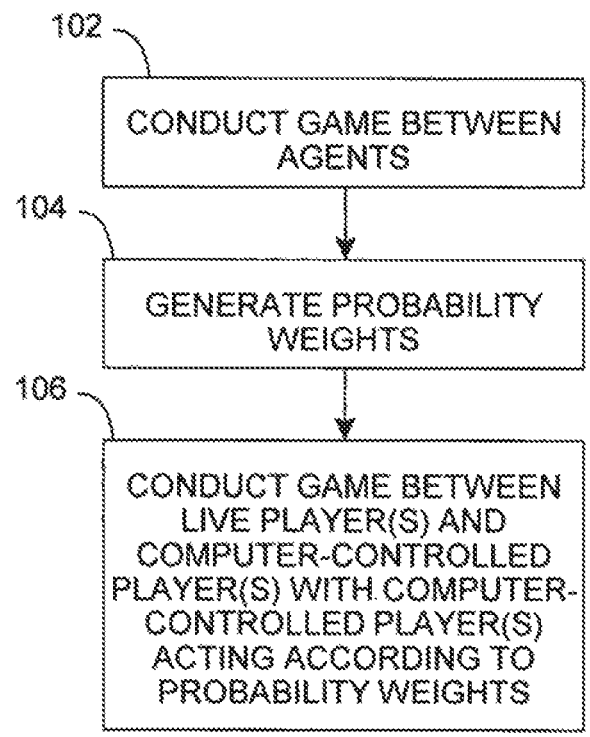
FIG. 1 is a flow chart of a method according to an embodiment of the present invention.

Reference is now made to the figures wherein like parts are referred to by like numerals throughout. The present invention is directed to a method and system for conducting a game between at least one computer-controlled player and at least one live player. Referring to FIG. 1, in its broadest terms, a method according to an embodiment of the present invention includes conducting 102 a game between agents (such as computer-controlled agents) to generate 104 probability weights. When the game is conducted 106 between a live player and a computer-controlled player the computer-controlled player acts, at least in part, based on the generated probability weights.

It is contemplated that any game could be conducted. For example, the game could be any card game, tile game, dice game, or the like including poker and its variants, Pai Gow and its variants, blackjack, baccarat, or any other game or game type. Thus, the examples given below as related to a version of Texas Hold'em poker should be interpreted as illustrative rather than limiting. However, it is noted that any game could be used which includes at least one decision node at which a computer-controlled player and a live player make a decision to select an action to produce a game outcome. As may be appreciated, the actions available (also referred to as candidate actions) at each decision node may change.

In an optional embodiment, the present invention may be applied to an embodiment of Texas Hold'em poker. The pot is seeded. In an optional embodiment, this could occur by one or more players placing a blind bet. In such an optional embodiment, the blind bet or blind bets may rotate among players. For example, in an optional embodiment, two blind bets, a big blind and a small blind may be received. In an alternate or additional optional embodiment, the pot may be seeded by an ante wager from one or more of the participating players.

As may be appreciated, any set of playing cards (including a conventional deck, truncated deck, or supplemented deck) could be used. In an optional embodiment, a single conventional poker deck of fifty-two cards is shuffled. Each player is dealt a hand of two cards. After dealing the hands to the players, a decision node is reached in which one of the players must make a decision to select an action. In an optional embodiment in which a big blind bet and small blind bet are used, player 2 (in this example, the player placing the big blind bet is referred to as player 1 and the player placing the small blind bet is referred to as player 2) has the option of folding (i.e. terminating his participation in the game), calling (i.e. matching) the big blind bet, or raising the big blind bet. If player 2 chooses to call the big blind bet or raise the blind bet, the decision shifts to player 1. In one optional embodiment, player 1 may have the option to call or raise any raise of the blind bet. In a further optional embodiment, player 1 may have the option to raise any call of the blind bet. For example, if the blind bet is two units, and player 2 calls the blind bet by wagering two units, player 1 may have the option (in one optional embodiment) of raising the call by wagering additional units. Thus, in an optional embodiment, multiple actions may occur at a decision node for each player. For example, if player 2 chooses to call the big blind bet, then player 1 chooses to raise, player 2 must make an additional decision to select a candidate action, e.g., call, raise, or fold, in response to player 1's raise. In an optional embodiment, the number of raises and/or the size of the raises may be limited. In an alternate optional embodiment, the bets and raises are not limited. In either case, the wagers are optionally accumulated to the pot.

This alternation continues until both of the players have wagered the same amount (typically ended with a call) or one of the players folds. If a player folds, player is terminated as to that player. In an optional embodiment including only two players, at least a portion of the pot is awarded to the player who did not fold. Conversely, if two or more players remain in the game, community cards are revealed. The community cards may be revealed in a single stage or in multiple stages. In an optional embodiment in which the community cards are revealed in a single stage, the revelation of the community cards may be followed by a decision node or the game outcome may be immediately evaluated and the wager resolved. In an optional embodiment in which the community cards are revealed in multiple stages, a decision node may occur between some or all of the stages and, optionally, after the final stage. Alternatively, the stages may occur merely for entertainment value without additional decision nodes.

The game outcome is evaluated. In an optional embodiment, the game outcome consists of a comparison of the highest ranking five-card poker hand that may be formed by each player from that player's hand plus the community cards. In an optional embodiment based on Texas Hold'em, the player may use any five of the seven cards available. In an optional embodiment based on Omaha Hold'em, the player may be required to use both the cards of the player's hand. It is contemplated that other variations would also be possible.

The hands are compared according to a predefined ranking of hands. The hand with the predefined ranking relationship to the other hand is declared the winning hand. For example, in an optional embodiment, a standard poker ranking of hands is used and the hand with the higher poker ranking is declared the winning hand.

In an example of a game according to such an optional embodiment, a first player places a big blind bet and a second player places a small blind bet. It should be noted that in an optional embodiment, a blind bet may be received from fewer than all the participating players. The first player receives a hand consisting of A♠K♦ and a second player receives a hand of 5♣4♣. Since the first player placed the big blind bet, the second player has a decision at the decision node to select one of three actions: call the big blind bet, raise the big blind bet, or fold. In this example, the second player decides to raise the big blind bet by matching the amount of the big blind bet and adding an additional raise. The first player has a decision at the same decision node to select from one of three actions: call the second player's raise, raise the second player's raise, or fold. In this example, the first player decides to raise the second player's raise by matching the second player's raise and adding an additional raise. If the limit of raises had been met, i.e. because the limit of the raises is equal to two raises, the second player would have the decision to select one of two actions: call the first player's raise or fold. If the limit of raises has not been met, i.e. because there is no limit to the number of raises or the limit of the raises is greater than two raises, play at the decision node shifts to the second player, with the option to call the first player's raise, raise the first player's raise, or fold. In this example, the second player decides to call the first player's raise. The second player's decision to call ends this decision node and the community cards are dealt. As mentioned above, the community cards could be dealt in stages with additional decision nodes interspersed between stages. In this example, five community cards consisting of A♣K♣2♣7♠7♦ are dealt in a single stage. Also, as noted above, a decision node could occur after the community cards are dealt. In this example, the dealing of the community cards is followed by the evaluation of the game outcome. The highest ranking five-card hand that the first player can form is A♣A♠K♣K♦7♦ (with a poker ranking of two pair) and the highest ranking five-card hand that the second player can form is A♣K♣5♣4♣2♣ (with a poker ranking of flush). In this example, conventional poker hand rankings are used. Thus, the second player is awarded at least a portion of the pot because a flush outranks two pair.

Figure 2:
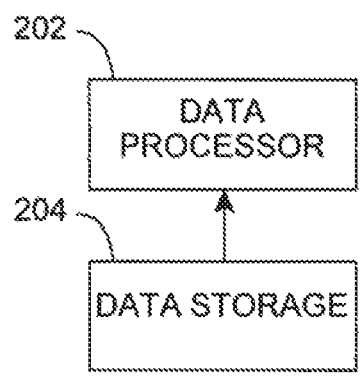
FIG. 2 is a block diagram of a system according to an embodiment of the present invention.
Figure 3:
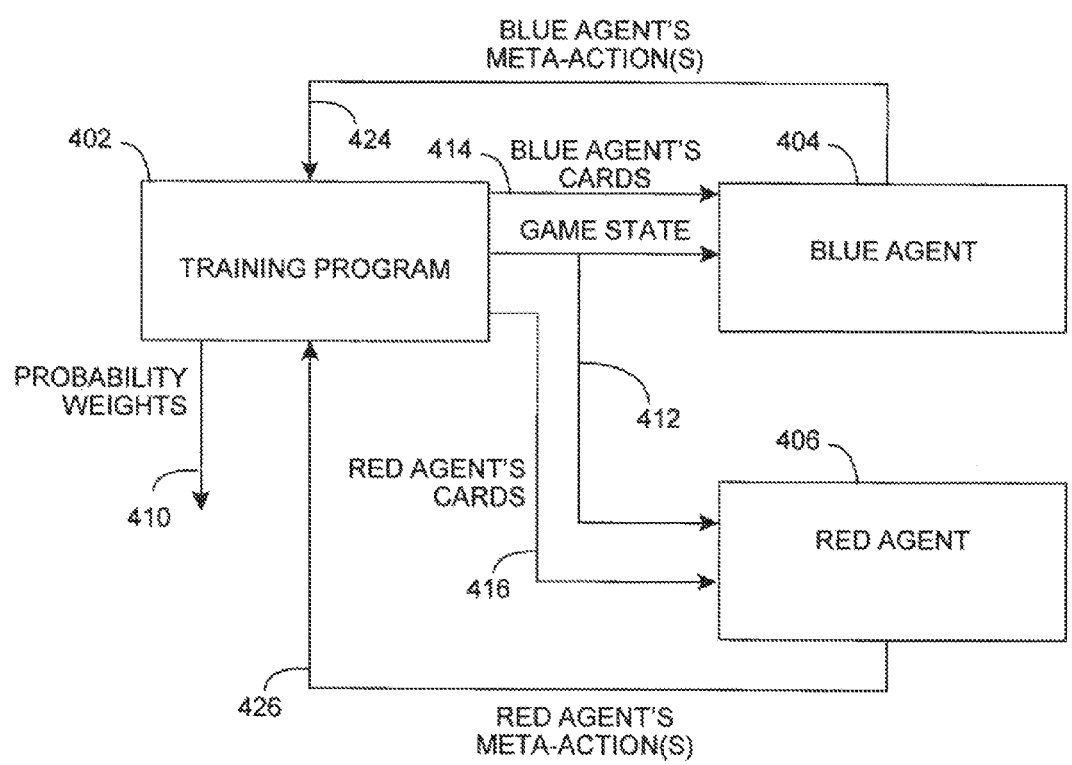
FIG. 3 is a flow diagram of a training program and agents according to an embodiment of the present invention.
Figure 4:
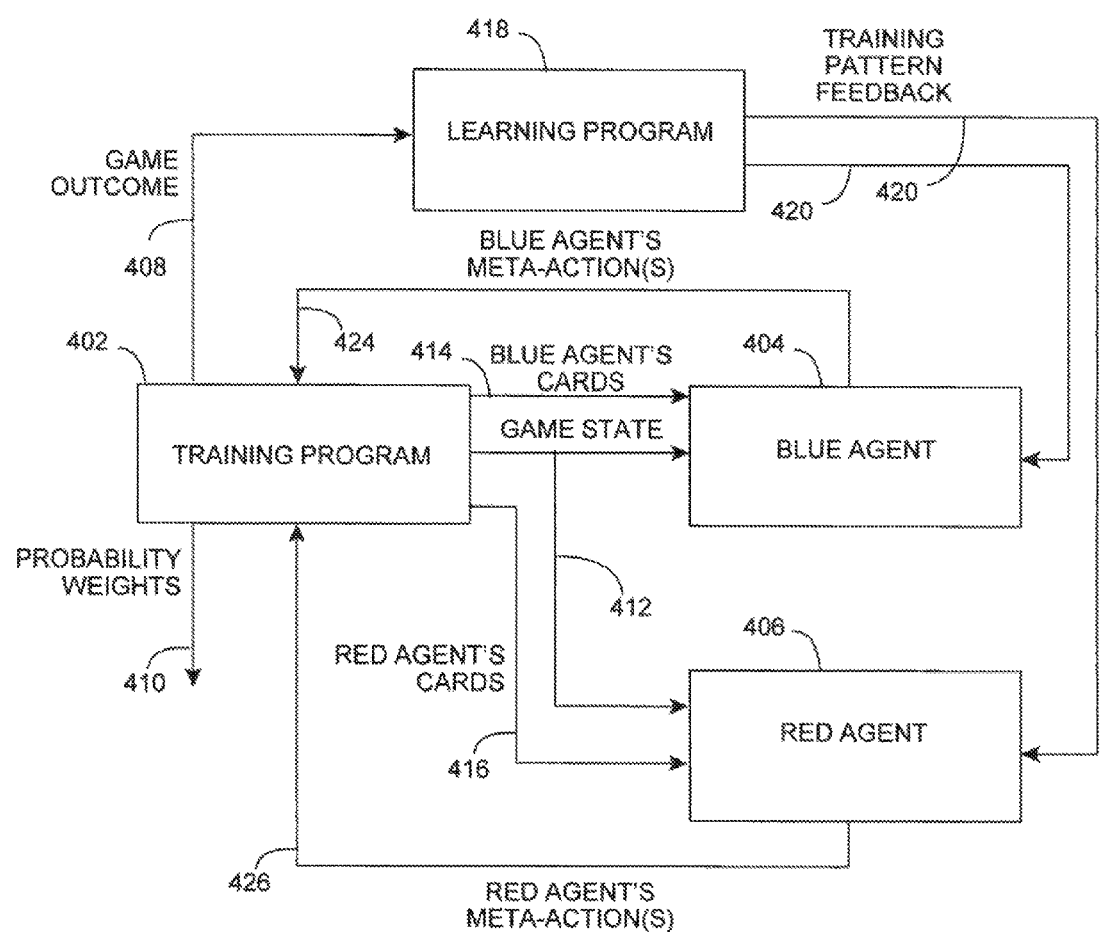
FIG. 4 is a flow diagram of a training program and agents according to an embodiment of the present invention.

Referring to FIG. 2, a system for implementing a game such as that described above includes a data processor 202 and a data storage 204 storing instructions executable by the data processor 202. More particularly, the instructions executable by the data processor 202 include a training program. Referring generally to FIGS. 3-6, a training program conducts the game to be implemented using two or more agents playing against one another under the control of the data processor. By conducting the game multiple times, probability weights are generated.

In an optional embodiment, agents are designed to act on the basis of available information. That is, in such an optional embodiment, an agent bases its decision to select actions on its own hand and the current decision node. In game-theoretic terms this means that the agents act on information sets and represent behavioral strategies. The game is conducted multiple times to produce game outcomes and probability weights are generated to correlate actions to the probability that the action will lead to a game outcome satisfying a predetermined criterion or criteria.

It is contemplated that the actions of the agents at the decision nodes may be determined in a random fashion. That is, in an optional embodiment, the actions of the agents at any given decision node are independent of any prior trials or decision nodes.

In another optional embodiment, it is contemplated that the actions of the agents at the decision nodes may be determined in a weighted random fashion based on prior trials. For example, in one optional embodiment, the agents may use a lagging anchor routine. If S represents the set of information states that the agent may encounter and $A(s)$ represents the finite set of available actions at state $s \in S$, for each $s \in S$ and $a \in A(s)$, the agent would have a probability $P(s, a)$ of applying action $a$ at information state $s$. If the agent's behavior is parameterized by $v \in V:P_v(s, a)$, where V is a closed convex subset of real numbers, the agent allows probability distributions over the set of legal actions for different information states, and these probability distributions may depend on a set of internal parameters of the agent (v). Thus, in such an optional embodiment, the goal of the training program is to find parameter values $v^* \in V$ so that the probability distribution corresponding to the parameter values produces game outcomes satisfying a predetermined criterion or criteria. It should be noted that other learning routines, such as Q-learning, or the like, could be used to control the agents, and thereby construct the probability table.

In an optional embodiment, the agent includes a neural net that takes as input the game state and one or more candidate actions, and gives a probability distribution of the candidate actions as an output. When such an agent responds to a game state at a decision node, it evaluates all available candidate actions and randomly chooses an action according to the probability distribution output from the neural net. For example, in an optional embodiment, the neural net may include a multi-layer perceptron design with one layer of hidden units and sigmoid activation functions. For updating, standard back-propagation of errors may be used in the training thereof. In one such optional embodiment, the neural net may include the following binary input units: thirteen units for representing the card values, one unit for signaling identical suit of the cards, one unit for signaling a pair, eight units for signaling the size of the pot, and three units signaling the candidate actions (fold, call, and raise). In an optional embodiment, described in greater detail below, the candidate actions may be combined into "meta-actions." In this regard, "meta-actions" may, in one optional embodiment, represent any set of one or more actions or, in another optional embodiment, represent a sequence of two or more actions. The output node of the neural net represents the probability weight that the agent assigns to the action or meta-action. In an optional embodiment, the number of hidden nodes may be set to twenty. In one such optional embodiment, the internal parameters (v's) are the neural net output probabilities, which may be adjusted by the training program.

In an optional embodiment, the probability function for each player/agent is a function of the neural net function for the player/agent. For example, in one such optional embodiment where the neural net function of a player/agent is denoted by $B_v(s,a)$, the probability function for that player/agent is $$P_v(s, a) = \frac{B_v(s, a)}{\sum_{\bar{a} \in A(s)} B_v(s, \bar{a})}.$$

The same relationship could give the probability function for the other player/agent(s).

As noted above, the game outcomes generated by the multiple iterations are used to generate probability weights that associates actions at the decision nodes to the probabilities that the actions will produce game outcomes that satisfy a predetermined criterion or criteria. In one optional embodiment, the predetermined criterion is the minimization of maximum loss (also referred to as a "minimax" criterion). That is, in such an optional embodiment, the probability weights favor, i.e., gives a greater probability of occurrence to, actions or meta-actions that tend to minimize the maximum loss. In an optional embodiment, the probability weights may include probability distributions for various game states, such that when a particular game state is encountered, a probability distribution correlated to that game state is utilized.

This construction may occur manually. For example, the multiple iterations of the game may be conducted and the probabilities may be tracked to produce the probability weights. For example, in the optional embodiment shown in FIG. 3, a training program 402 generates probability weights 410 based on the conduct of a plurality of games by two agents, referred to in this example as "blue agent" 404 and "red agent" 406. Inputs to blue agent 404 include blue agent's cards 414 and the game state 412 (e.g. the betting state, any community cards, and the like) and inputs to red agent 406 include red agent's cards 416 and the game state 412. The training program conducts the game using the action(s) or meta-action(s) 424, depending on the embodiment, selected by blue agent and the action(s) or meta-action(s) 426, depending on the embodiment, selected by red agent at the decision nodes encountered during the game. As previously suggested, the game outcomes in these games resulting from the action(s) or meta-action(s) taken by blue agent and red agent are evaluated against predetermined criterion or criteria by the training program 402 and the probability weights 410 are constructed to emphasize those action(s) or meta-action(s) that were more likely to produce a game outcome meeting the predetermined criterion or criteria.

In another optional embodiment, the probability weights may be generated by optimizing the agents to meet the predetermined criterion or criteria, and using the probability output from the optimized agents. For example, in the optional embodiment of FIG. 4, this may take the form of the training program 402 including a learning program 418 that updates or adjusts the agents 404, 406 as the multiple iterations are conducted. In one such optional embodiment, agents 404, 406 play a sample game to its conclusion. Then each agent 404, 406 performs a "what if" analysis in which an additional game is completed by the agents 404, 406 for each action not selected in the original game at each decision node visited. The outcomes of these hypothetical games provide estimates of how successful alternative actions would have been. The agents then modify their behavior, optionally through a neural net, to reinforce those actions that would have been the most successful, i.e. would have been more likely to produce a game outcome that satisfies the predetermined criterion or criteria. In one such optional embodiment, this is accomplished through the use of training pattern feedback 420 to the agents 404, 406 of input and desired output. If a given action or meta-action 424, 426 appears more successful in producing a game outcome that satisfies the predetermined criterion or criteria than the others, for the given game state, the agent 404, 406 is biased to apply it more often. This means that the training pattern feedback 420 could be given by the training program's evaluation of the state-action pair offset by the action's relative success compared to the other actions. Because of this relative nature of the feedback signals, there is a risk that the agent's outputs may drift toward zero or one, which hurts the back-propagation learning. In an optional embodiment, the agent's outputs approximate probability distributions, and therefore adjustment of the feedback signals in the training patterns is done accordingly. For example, in pseudo-code, an optional embodiment could include instructions as follows (where vector quantities are shown in boldface, keywords are displayed in boldface courier, and each agent's (called Blue and Red) probability function is denoted by B(•,•) and R(•,•), respectively:

```
repeat Iteration times {
    ( play a game between agents called
    Blue and Red )
    for ( each decision node n ∈ g ) do {
        A ← ( legal actions at n )
        E ← ( outcomes of games resulting from
        actions A at n )
        if ( Blue on turn in n )    { P ← B(s, A) }
        else                        { P ← R(s, A) }
        p_sum ← 1^τ P
        e ← P^τ E/p_sum
        E ← E - 1e
        F ← P + E - 1 (p_sum - 1)
```

```
    if ( Blue on turn in n ) { ⟨ train B with
                                  patterns
                                  {(s, A), F} ⟩ }
    else                      { ⟨ train R with
                                  patterns
                                  {(s, A), F} ⟩ }
    }
}
```

Operations involving vectors are interpreted componentwise, so the notation implies several for-loops. As an example, the statement {⟨ train B with patterns ((s, A), Fi⟩ } may optionally be implemented as:

for (i=1 ... length(A)) do {⟨ train B with pattern ((s, A), F⟩ }.

The vector E represents game outcomes for the agents in games that explore the different actions A in node n. In these games, the agents' hands and the community cards are held fixed with the actions changing in different iterations. E represents the outcome of the actual game as the estimated outcome from taking the action chosen in that game. The number e estimates the expected payoff for the player on turn, given his current probability distribution over the actions A. The statement E←E−1e normalizes E by deducting e from each component. F is the calculated vector of feedback, and the term −1 ($p_{sum}$−1) is included to push the probability function (B or R) towards valid probability distributions.

The agents may optionally be evaluated to ensure that the actions or meta-actions selected at each decision node lead to game outcomes that satisfy the predetermined criterion or criteria. For example, in one optional embodiment, where the predetermined criterion is play that produces game outcomes that minimize the maximum loss (also known as a "minimax" strategy), the agents may be measured using the performance measure of "equity against globally optimizing opponent" or Geq. The Geq measure is defined as the expected payoff when the agent plays against its most effective opponent, e.g., the best response strategy in game-theoretic terms. The Geq measure conforms with game theory in the sense that an agent applies a minimax strategy if, and only if, its Geq is equal to the game's value, which is the maximum Geq achievable.

In an optional embodiment, the agents are developed and conducted as separate agents that compete against each other. In an optional embodiment, the agents may be merged into a single agent that plays both sides of any one game for the purpose of evaluation. That is, in one such an optional embodiment, a single game is implemented as a pair of games, with each agent playing both hands against the other agent, e.g. agent 1 plays hand A against agent 2 playing hand B, while simultaneously agent 1 plays hand B against agent 2 playing hand A. In one optional embodiment, for the sake of variance reduction, the cards may be fixed in both games, so that both agents get to play the same deal from both sides. The average of the two game outcomes is then taken as the merged game's outcome. In such an optional embodiment, the redefined pair of games has a value known to be zero, by symmetry (i.e., in such an optional embodiment, the amount won must equal the amount lost in any game pair).

In an optional embodiment, reference players may be created for comparison to evaluate an agent's performance. For example, in an optional embodiment, a set of three reference players employing different strategies (such as a balanced-player, an aggressive-player, and a random-player) may be created. In one such optional embodiment, a balanced-player is an estimate of a minimax-playing agent, an aggressive-player is an agent that rarely folds and raises often, and a random-player is an agent that makes completely random actions, with uniform probabilities over actions. As noted in my article entitled "A Reinforcement Learning Algorithm Applied to Simplified Two-Player Texas Hold'em Poker" (incorporated herein by this reference), an agent operating according to the procedure previously described appears to produce probability weights that allows a computer-controlled player to play in a manner that approximates a minimax strategy. It is noted that this reference should be construed as explanatory rather than limiting as the present invention contemplates any form of agent, whether or not utilizing a learning program while producing the probability weights. Moreover, even where a learning program is used, the present invention contemplates that the agent could conduct the games in any fashion, and may be evaluated against any predetermined criteria, and should not be limited to the examples given herein.

As noted above, in controlling the agents, the training program may control the agents to make each decision separately so that actions are selected singly. For example, in an optional embodiment in which a decision node includes one or more actions selected from call (or check), raise, or fold, the agent may select each action separately. Thus, in one such optional embodiment, an agent faced with a decision at a decision node in a particular game state may select an action to raise. If the responsive action from the opposing agent in that decision node is to raise, the agent would reevaluate and decide whether to call, raise, or fold. The separate treatment of each decision does not necessarily preclude the use of prior actions or projected future actions in selecting an action. For example, an agent may decide whether to call, raise, or fold based on its prior action or on the actions it may take (or its opponent may take) in the next decision or decision node. In an alternate optional embodiment, the decision at any particular game state may be made based on the game state without regard to prior actions and/or future projected actions.

In such an optional embodiment, the probability weights generated correlate actions or groups of actions to a probability for selection based on whether the action or group of actions produced a game outcome meeting the predetermined criterion or criteria. For example, at a particular decision node at a particular game state, the three actions (A1, A2, and A3) may be available. The game outcomes that result in the games in which those actions were taken would be evaluated and, in an optional embodiment, normalized so that the probability distributions add to 1. If, for the sake of example, A1 has a probability distribution of 0.6, A2 has a probability distribution of 0.1, and A3 has a probability distribution of 0.3. of producing a game outcome satisfying the predetermined criterion or criteria, probability weights such as that shown in Table 1 could be generated:

TABLE 1

| Action | Probability of selection |
|---|---|
| 1 | 0.6 |
| 2 | 0.1 |
| 3 | 0.3 |

Thus, in such an optional embodiment, the agent (if the probability weights are fed back into the agent) and/or the computer-controlled player (as discussed in greater detail below) would be more likely to select A1 than A2 or A3 at a particular decision node. However, since A2 and A3 are not precluded from selection, a certain amount of randomness or "bluff" may be introduced into the control of the agent and/or computer-controlled player since those actions will, on occasion, be selected when a decision node in the same or similar game situation is reached.

In another optional embodiment, the training program may group multiple actions into "meta-actions." Meta-actions could simply be sets of one or more actions or, in a further optional embodiment, could be sequences of two or more actions. It should be noted that the set or sequence of actions represented by a meta-action could occur at a single decision node or could take place across multiple decision nodes.

For example, in an optional embodiment in which a decision node may include wager and fold actions, i.e. a player may have one or more options selected from call (or check), raise, or fold, a meta-action for that decision node could be the sequence "raise-raise-fold." In one optional embodiment, this meta-action could represent the sequence of actions at a single decision node which would mean that, at that decision node, the agent raises the bet, if the other agent does not call or fold, the agent again raises the bet, and if the other agent does not call or fold, the agent folds. In another optional embodiment, this meta-action could represent the sequence of actions to be taken at each point where a decision is called for, e.g. the agent raises the bet, then raises the bet again at the next point in the game (whether at the same decision node or a later decision node) where a decision is called for, then folds at the next point in the game (again whether at the same decision node or a later decision node) where a decision is called for.

In such an optional embodiment, the probability weights generated may correlate meta-actions to probabilities of selection (e.g., probabilities that the meta-action will lead to a game outcome satisfying the predetermined criterion or criteria). In an optional embodiment, the probabilities are scaled such that, when they are all added up, they equal 1. For example, in one optional embodiment, six meta-actions (MA1, MA2, . . . , MA6) may be defined. If MA3, for example, had a probability distribution of 0.4, MA6 had a probability distribution of 0.3 and the rest of the probability distributions were significantly less, with MA4 being approximately 0.1, MA2 being approximately 0.1, and MA5 being approximately 0.05, and MA1 being approximately 0.05, probability weights would be generated in which MA3 would tend to be selected more frequently than any other meta-action because it tended to produce a game outcome that satisfied the predetermined criterion or criteria more frequently. In other words, in this example, the probability weights generated by the agents would appear as shown in Table 2:

TABLE 2

| Meta-action | Probability of selection |
|---|---|
| 1 | 0.05 |
| 2 | 0.10 |
| 3 | 0.40 |
| 4 | 0.10 |
| 5 | 0.05 |
| 6 | 0.30 |

It is noted, however, that in this optional embodiment, there may be some randomness or "bluff" incorporated because the remaining meta-actions are not precluded from selection. In fact, in this example, MA3 is only slightly more likely to be selected than MA6. Thus, in such an optional embodiment, the agent (if the probability weights are fed back into the agent) or the computer-controlled player (as discussed in greater detail below) would not necessarily select the same meta-action every time a decision node in the same or similar game situation is reached.

Figure 5:
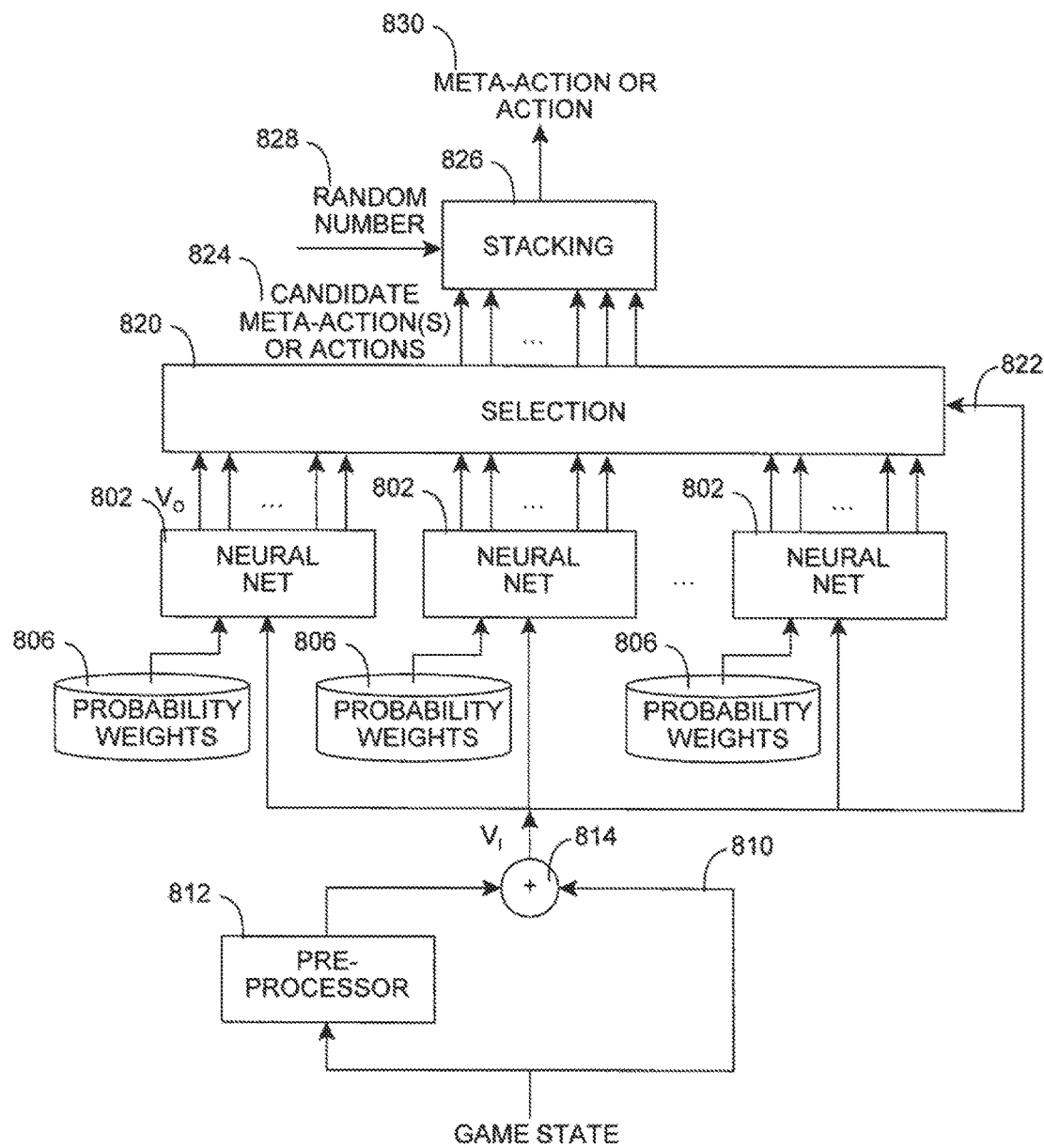
FIG. 5 is a flow diagram of an optional embodiment of an agent according to an embodiment of the present invention.
Figure 6:
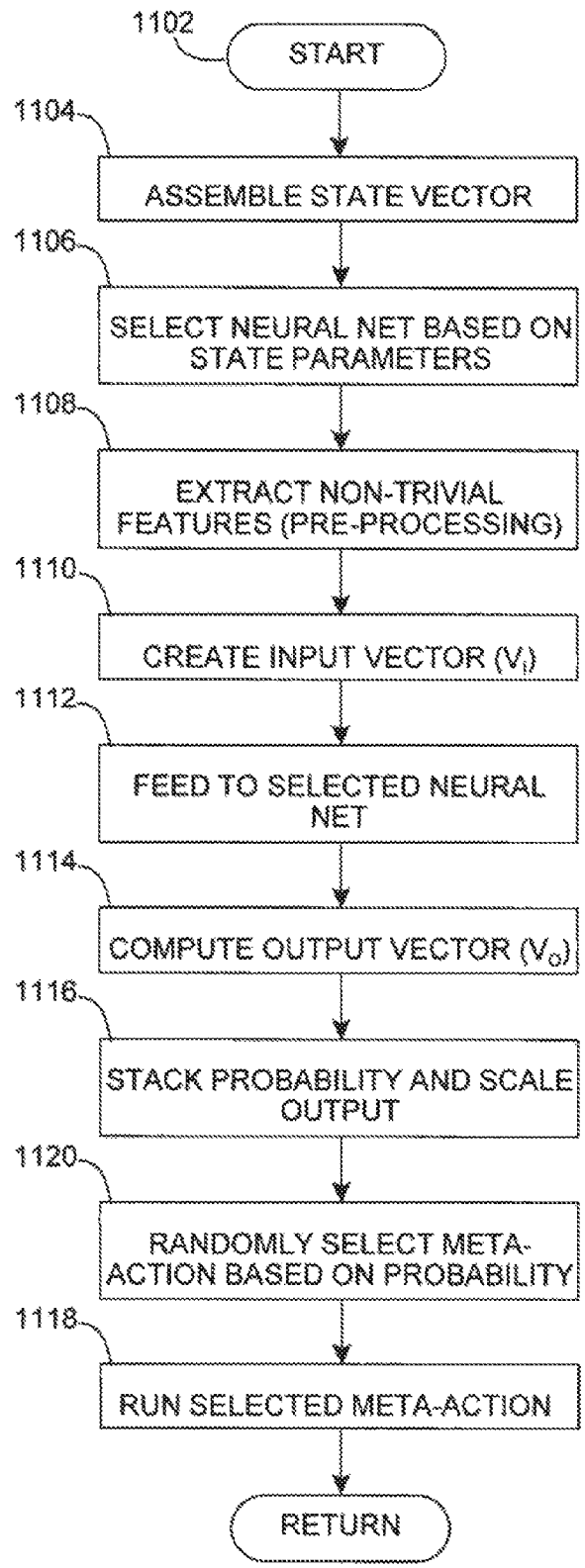
FIG. 6 is a flow chart of a method for controlling an agent or a computer-controlled player according to an embodiment of the present invention.

For example, one such optional embodiment is shown in FIGS. 5 and 6. It should be noted that while the optional embodiment of FIGS. 5 and 6 are described here as an agent, it is contemplated that a computer-controlled player could also take the form shown in FIGS. 5 and 6. Referring first to FIG. 5, an agent may include a plurality of neural nets 802. Optionally, each of the neural nets 802 utilizes substantially the same architecture, but each has a unique and distinct set of neural net weights in an associated database 806. That is, in an optional embodiment, each of the neural nets 802 is trained on a particular set of inputs for a particular set of outputs.

The game state, e.g., the state of the cards, the state of the bets, and the like, are input on an input 810. In an optional embodiment, the agent includes a preprocessing routine performed by a preprocessor 812 that basically determines nontrivial aspects. For example, the preprocessing routine could examine at the status of a particular two card hand received by the agent and calculate the "strength" of the raw hand, for example, by calculating the probabilities of all possible hands that the opponent agent might have and assess a probability or strength for that particular hand based on those two cards. It is contemplated that such preprocessing may occur, or may be repeated, at various points in the game play, such as when additional community cards are exposed. It should be noted that while FIG. 5 illustrates the use of a preprocessor 812, it is contemplated that this need not be performed using a separate operation, but could occur within a neural net 802, or other process.

Returning to the optional embodiment of FIG. 5, a vector of inputs ($V_I$), that includes the preprocessed states from the preprocessor 812 and the game state 810, is output from a summing block 814. This input vector 822 is communicated to the neural nets 802. In the optional embodiment of FIG. 5, each of the neural nets 802 is state dependent. This state dependency means that each neural net 802 is concerned with only certain game states. Stated another way, in an optional embodiment, each of the neural nets 802 is associated with a different portion of the input space, i.e., a different game state or set of game states. For example, in the very first step of the game, all of the community cards are hidden and the input from those community cards is "0." In an optional embodiment, the neural net provided for such an initial game state may differ from a neural net provided for a later game state, e.g., when one or more community cards have been revealed. Alternatively, certain game states may not include a separate neural net, but share a neural net with other game states.

Optionally, the agent may be further simplified by considering that there are a limited number of actions that can be taken by the agent at any point and these are the available outputs from the neural net that is associated with that portion of the game. Thus, in such an optional embodiment, there is a restricted set of outputs for each of the neural nets relative to the others. By training the neural net on a restricted set of inputs and providing a restricted set of outputs, the agent can be simplified.

In the optional embodiment of FIG. 5, for example, each of the neural nets 802 is uniquely trained for a particular game state based input and restricted set of outputs associated with the particular portion of the game that it is dedicated to. The neural nets 802 output a vector output "$V_o$" that is input to a multiplexer 820. The selection input on the multiplexer 820 is received on input 822 and this is based upon the state input vector $V_I$.

Continuing with the example of FIG. 5, the multiplexer 820 is operable to select one of the neural nets 802 for the output thereof and only this neural net is actually run. That is, in this optional embodiment, there is no necessity to run the neural net engine for the other neural nets, as they were not selected based on game state. As such, an optional embodiment may include a single neural net engine with the neural net parameters selected based on which neural net 802 is selected. The selected neural net 802 is run and to produce an output of candidate actions or, in the case of FIG. 5, meta-actions 824.

As previously described, meta-actions are grouped actions such as the sequence "call-raise-fold." This means that there may be, at a point in the game, a decision by the agent to respond with a call or a check which, if the opponent does not fold, then the agent will raise on the next opportunity and, if the opponent does not fold, the agent will fold. This is a group of actions that are predetermined at a single time based on probability distributions and termed as a "meta-action."

The optional embodiment of FIG. 5 includes a stacking routine 826 that allows for stacking of the candidate meta-actions. A random number 828 is optionally utilized to select from among the available meta-actions 824 for output of one meta-action 830. Broadly stated, in this optional embodiment, the agent determines an input vector, selects a neural net based on game state, and randomly selects one of the meta-actions therefrom. By "randomly" it is contemplated that the selection may be a weighted-random selection where each of these meta-actions has a probability distribution, such that certain meta-actions may be more likely to be selected than others. In such an optional embodiment, a random number generator is operable to select among these meta-actions based upon that probability distribution.

As previously discussed, agents may include a stacking routine 826 to assist in the selection of meta-action(s). In one such optional embodiment, each meta-action represents a different series of actions implementing a different group of decisions and each meta-action has a probability associated therewith. As discussed above, optionally, the probabilities are scaled such that, when they are all added up, they equal 1. In such an optional embodiment, a random number generator generates a random number 828 between 0 and 1 and the meta-action correlated to that random number 828 is selected from the stack.

Turning to FIG. 6, a flow chart illustrating an optional embodiment of a method for selecting actions or meta-actions by an agent or a computer-controlled player is illustrated. A method may start 1102 and proceeds to the assembly 1104 of a state vector. As discussed above, the state vector optionally includes the game state. A neural net is selected 1106 based on the game state. Optionally, the game state is preprocessed to extract 1108 non-trivial features and an input vector $V_I$ is created 1110. The input vector is communicated 1112 to the selected neural net. As noted above, in an optional embodiment, a single neural net may be used to produce the same effect as multiple neural nets by parameterizing a "generic" neural net to the selected neural net before operation. An output vector $V_O$ of candidate meta-actions results 1114 from the neural net. The meta-actions are stacked and scaled 1116 according to the probabilities associated with each of the meta-actions for that neural net output. A meta-action is selected 1120 in a weighted-random fashion. The selected meta-action is executed 1118.

Figure 7:
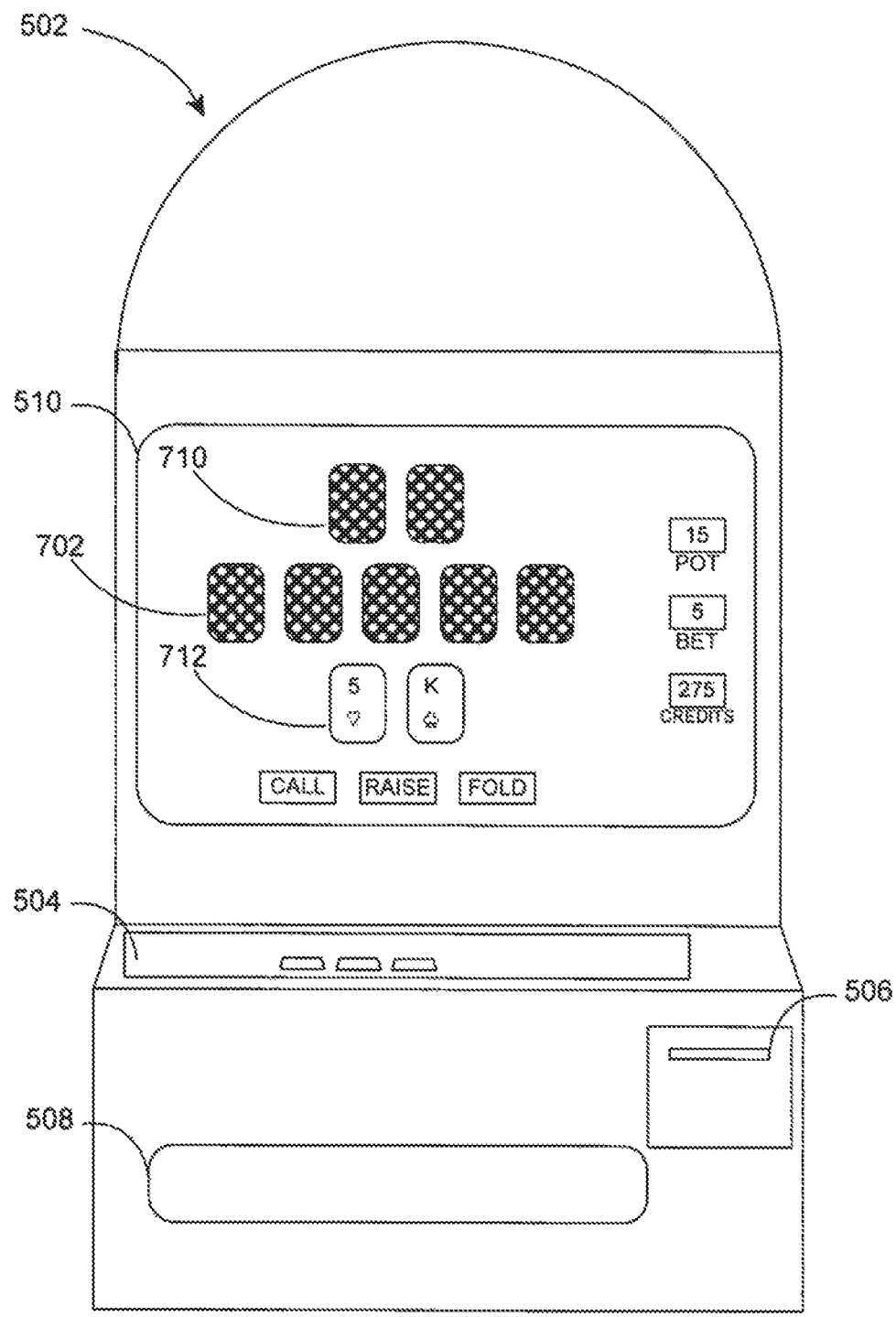
FIG. 7 is a front view of a gaming device according to an embodiment of the present invention.
Figure 8:
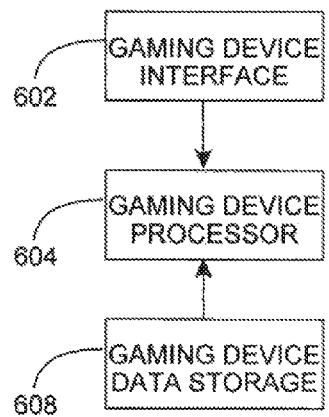
FIG. 8 is a block diagram of a gaming device according to an embodiment of the present invention.

Turning to FIGS. 7 and 8, a system according to the present invention also includes a gaming device for conducting the game between a live player and one or more computer-controlled players. The gaming device includes a gaming device processor 604, a gaming device interface 602, and a gaming device data storage 608. In an optional embodiment, the gaming device may include a chassis 502 which has associated therewith a gaming device interface 602. Since the gaming device could take any form, including a gaming machine, personal computer, handheld device or personal digital assistant ("PDA"), cellular telephone, kiosk, terminal, or other form, the chassis 502 could be in any size, shape, or form. The gaming device interface 602 receives input from a live player and may incorporate any type of input device 504, including a touchscreen, button panel, pointer, mouse, keyboard or key pad, or any other form. Optionally, the gaming device interface 602 also includes a display 510. In one optional embodiment, the display 510 and input device 504 are separate from one another; in an alternate optional embodiment, the gaming device interface 602 may be a touchscreen or other device in which the input device 504 and display 510 are integrated. Optionally, the gaming device may further include a wager receiver 506 that receives wagers in the form of coin, currency, tickets, vouchers, machine-readable cards, or the like. The gaming device may optionally include an award handler 508 issue awards in the form of coin, currency, tickets, vouchers, machine-readable cards, or the like, that are earned by a live player as a result of a game outcome.

As may be appreciated, a display 510 may display indicia used in the game (such as cards, tiles, dice, or other game indicia) along with wagers and other information. For example, an optional embodiment directed to poker or other forms of card games, the display 510 may include a display of the cards in the hand dealt to the player. As discussed above, for example, in a Texas Hold'em a player hand of two cards will be displayed to the live player. In an optional embodiment, the computer-controlled player or player(s) will not have "knowledge" of the live player's cards. Optionally, the display 510 may also include a representation of each computer-controlled player's cards displayed as if they were face-down or otherwise concealed from the live player's view. In an optional embodiment directed to a game in which community cards are used, the display 510 may include a representation of any community cards face-down or otherwise concealed from the live player's view, and may include animation to reveal the cards such as turning the concealed cards over.

As previously noted, a gaming device includes a gaming device processor and a gaming device data storage. However, it should be noted that it is not necessary that each gaming device have a separate and independent gaming device processor and/or gaming device data storage and it is contemplated that, in an optional embodiment, a plurality of gaming devices could share a gaming device processor and/or a gaming machine data storage. Similarly, it is noted that the gaming device processor and/or gaming device data storage need not be local to the gaming device but could be remote from the gaming device and communicate with the gaming device via a wire or wireless communication link, network connection, Internet connection, or the like.

With continued reference to FIGS. 7 and 8, a gaming device according to an embodiment of the present invention may include a display 510 and input device 504 interfaced through a gaming device interface 602 which, in turn, communicates with a gaming device processor 604. The gaming device processor 604 communicates with a gaming device data storage 608 storing instructions executable by the gaming device processor 604 to conduct a game. Specifically, the instructions include a game program that controls one or more computer-controlled players against one or more live players who play a game via the gaming device interface 602.

Figure 9:
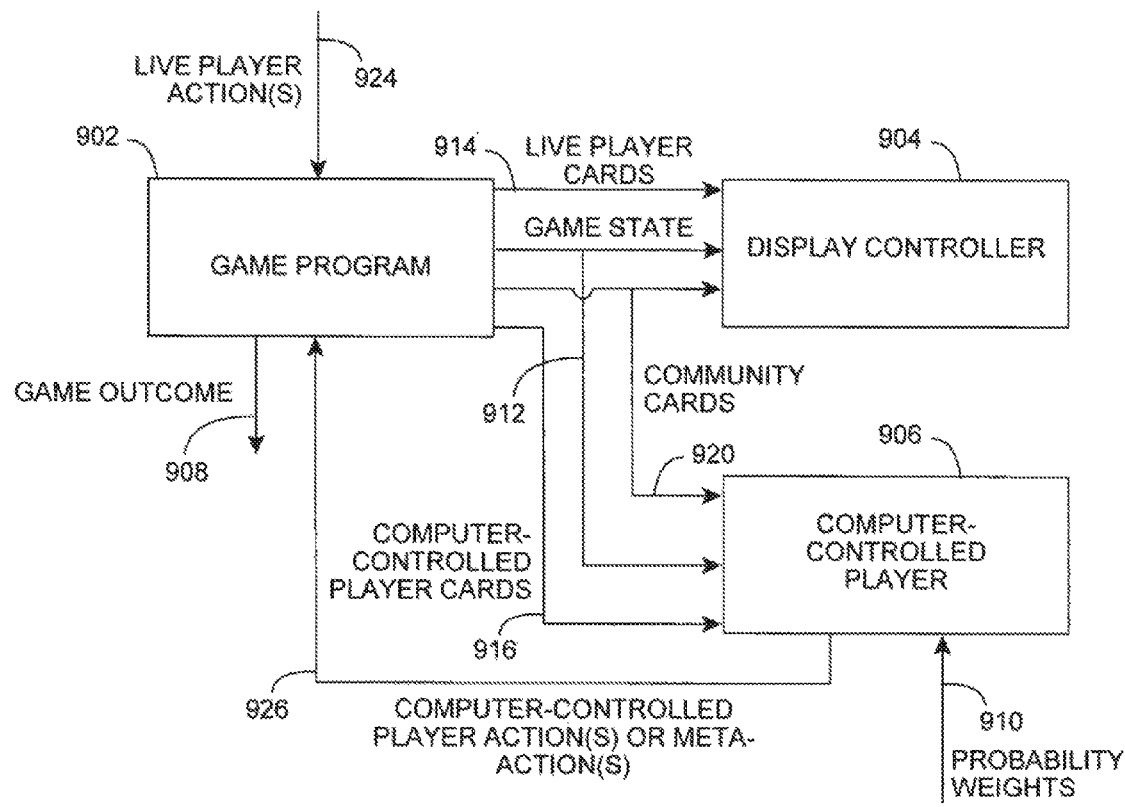
FIG. 9 is a flow diagram of a game program and computer-controlled player according to an embodiment of the present invention.

Referring generally to FIG. 9, at least one of the computer-controlled player(s) conducts the game by making at least a portion of the decisions at the decision nodes based on the probability weights generated by the training program. In an optional embodiment, the computer-controlled player(s) may take actions singly or may make actions in sets or sequenced sets, e.g. as meta-actions.

For example, in an optional embodiment, the computer-controlled player(s) are controlled (optionally through a neural net) so that those actions more likely to lead to a game outcome meeting the predetermined criterion or criteria according to the probability weights are more likely to be selected. In one such optional embodiment, probability weights define the mapping of information that is received on the input of a neural net at a computer-controlled player to the output. In such an optional embodiment, the output of these neural nets is a probability distribution for certain actions. That is, there are a number of possible actions associated with each decision to be taken at a decision node, e.g. fold, call, raise, and the like, with each decision node including one or more actions, e.g. fold, call, or raise on the first decision, then fold, call, or raise if the opponent raises, and the like. Each of these actions at each of these actions is associated with a probability distribution. In such an optional embodiment, the actions may be made separately, in series, such that each decision is evaluated according to the probability weights and the inputs (such as the game conditions at the particular decision node). In an optional embodiment, a computer-controlled player may be controlled to make a decision by making a weighted-random selection based on the probability weights generated.

In another example, actions may be grouped into sets equivalent or analogous to the meta-actions described above with respect to an optional embodiment of the training program. That is, in such an example, the computer-controlled player(s) may be controlled by meta-actions, i.e., a set of one or more actions (optionally a sequenced set of two or more actions), determined according to the inputs, such as the conditions existing at the decision node, and the probability weights so that the meta-actions more likely to lead to a game outcome consistent with the predetermined criterion or criteria.

In an optional embodiment, the computer-controlled player may be controlled to select a meta-action randomly based on the probability weights generated. As with the training program, the meta-actions could comprise a set of actions to be taken at a particular decision node or could be a set of actions that could occur across two or more decision nodes.

For example, in an optional embodiment, when a computer-controlled player receives a hand of K♥J♥, probability weights may indicate that five meta-actions (MA1, MA2, . . . , MA5), are associated with the following probabilities for leading to a game outcome consistent with the predetermined criterion or criteria: MA1: 0.05, MA2: 0.1, MA3: 0.5, MA4: 0.05, MA5: 0.3. In this situation, a random selection is made from among the five meta-actions based on the probability weights. Thus, in this case, MA3 would be the most likely to be selected, although MA5, MA2, or MA1 or MA4 could also be selected, in order of decreasing likelihood.

Such a random selection could be accomplished in many different ways. In one optional embodiment, for example, the game program may include, or may communicate with, a random number generator. The random numbers that may be selected may be allocated among the possible meta-actions based on the probability weights. Thus, in the example given, 5% of the random numbers may be allocated to MA1, 10% of the random numbers may be allocated to MA2, 50% of the random numbers may be allocated to MA3, 5% of the random numbers may be allocated to MA4, and 30% of the random numbers may be allocated to MA5. A random number is generated, and the meta-action to which the random number is allocated is selected for the conduct of the computer-controlled player. It is noted in an optional embodiment having multiple computer-controlled players, the computer-controlled players may be conducted using the same probability weights or different probability weights; using the same random number allocation or different random number allocations; using the same random number or different random numbers; or may otherwise be conducted separately from, or interdependently with, one another.

The probability weights could be stored locally, e.g. at the gaming device, or may be stored in a database storage device (not shown) separate from the gaming device. For example, the database storage device could be a file server, network server, remote storage, or the like that is separate from, and in communication with, the gaming device.

In an optional embodiment, the probability weights may be fixed by the training program. In such an optional embodiment, the game program is unable to alter the probability weights through any "experience" gained through conducting the computer-controlled player(s) against the live player in the game. In such an optional embodiment, the probability weights followed by the computer-controlled player may be "fixed" such that for a given set of inputs, the probability distribution will always be the same.

In an alternate optional embodiment, the probability weights may be updated by the game program based on the game outcomes occurring when the game is conducted between the computer-controlled player(s) and the live player. Such updating could occur at any time in the conduct of the game, including on a periodic basis, a real-time basis, or any other basis.

Referring to the conduct of the game, the game may take any form and may use any type of game indicia. While the example given below refers to a card game and the use of playing cards, it is noted that this is illustrative only and should not be interpreted as limiting.

In an optional embodiment, the game is a symmetric game. As may be appreciated, "symmetric" could have many different meanings. For example, as shown in FIG. 6, the game may be a game where the payoffs for playing a particular strategy depend only on the strategies employed, not on who is playing them. That is, if one can change the identities of the players without changing the payoffs or the strategies, then the game may be termed "symmetric." As a subset of such a "symmetric" game, the games may include games in which the same actions are available to each of the live player and the computer-controlled player at any decision node. It is also noted that a "symmetric" game may include games in which the symmetry occurs over the long term, e.g. there are differences in the situation each player finds himself or herself in, but these even out over the long run. For example, a game including a rotating blind bet on each hand would, in any single game, have different strategies for the player with the blind bet and the player without the blind bet. However, over the long run, each will have the blind bet roughly the same number of times.

A game is "zero-sum" if the win of one side is equal to the loss of the other. As such, two-player Texas Hold'em with a limit on the wagering could be characterized as a symmetric, zero-sum game. Where a blind bet is included, the game program may take the form of a mixed strategy. This implies that, if the live player applies the same mixed strategy as the one represented by the game program, i.e., using the probability weights, that live player would in the long term break even. This theoretically occurs because the blind bet rotates between the live player and the computer-controlled player(s). Therefore, any advantage that may be had shifts as the blind bet shifts. Thus, an optional embodiment of the present system may be characterized an electronic gaming device that allows a live player to play a symmetric zero-sum game against a fixed mixed strategy, where payoffs are given and monetary units handled by the device. In such an optional embodiment, the probability that an action will be taken in response to a decision is distributed over several actions. Such an optional embodiment provides a situation, from the perspective of the live player, where the live player is perceived to be on equal footing as the computer-controlled player.

The game program optionally includes a program module for handling the game indicia, such as playing cards. For example, in an optional embodiment, the game program includes a program module to randomize and deal cards (or electronic representations thereof) to one or more live players and one or more computer-controlled players. Thus, in one optional embodiment, the game program includes a program module to shuffle cards and select from the shuffled deck a defined quantity of cards for the game. In an example directed to two-player Texas Hold'em, for example, nine cards would be selected, e.g. dealt, from the deck—two for the live player's hand, two for the computer-controlled player's hand, and five for the community cards.

The game program also tracks the wagers and rewards. For example, in an example directed to Texas Hold'em, the game program may include a program module to track the pot value by tracking the wagers (call wagers, blind bets, raises, and the like) and aggregating them in a pot. Upon certain game outcomes, at least a portion of the pot may be awarded to the player such as through a game credit register, through a reward handling device, or the like. It is noted that in an optional embodiment of the computer-controlled player, the game program would be wagering house funds and, thus, the game could be house-banked. The live player, on the other hand, could be required to cover any wagers (blind bets, call wagers, raises, and the like) by maintaining a positive balance in a credit register at the gaming device, depositing money, or accessing a credit or wagering account sufficient to cover any wagers. In an optional embodiment, the game program may maintain a running balance and settle with a live player at the end of a play session. In such an optional embodiment, the player's balance cash, voucher, coded card, or the like may be issued to the live player when the live player terminates play.

Referring to the optional embodiment of a gaming device of FIG. 7, a display for a game of two-player Texas Hold'em may include community cards 702 initially displayed face-down, a computer-controlled player hand 710 that is known to the game program but is displayed face-down to the live player, and a live player hand 712 that is visible to the live player, but is unknown to the computer-controlled player, i.e. in such an optional embodiment the live player hand is not provided as an input to the computer-controlled player in making its actions.

Referring to FIGS. 7-9, a game program 902 is shown separate from a computer-controlled player 906. It should be appreciated that the game program 902 and the program controlling the computer-controlled player 906 may be executed by a single gaming device processor 604. In an optional embodiment, however, certain information provided to the game program 902 is input to the computer-controlled player 906.

For example, in the optional embodiment of FIGS. 7-9, a game program 902 may communicate data representing live player cards 914 and information representing the game state 912 (such as pot size, blind bet size, call bet size, raise bets, and the like) to a display controller 904 controlling a display 510. The game program 902 may receive live player action(s) 924, such as through a gaming device interface 602 controlling an input device 504. The computer-controlled player 906 may receive inputs in the form of the computer-controlled player's cards 916 and the game state 912. In an optional embodiment including community cards 920, data representing the community cards 920 may be displayed at the display controller 904 and provided as an input to the computer-controlled player 906. The computer-controlled player 906 has access to the probability weights 910 and selects one or more actions (or meta-actions, depending on the optional embodiment) at one or more decision nodes based at least in part on the probability weights 910 for the particular game state, e.g. the state formed by one or more of the computer-controlled player cards 916, the game state 912 (including any live player actions 924), and any community cards 920. For example, in an optional embodiment, the computer controlled player 906 makes a weighted random selection of an action where the weights are extracted from the probability weights 910 at the game state. Selected computer-controlled player actions 926 may be provided to the game program 902. Conduct of the game by the game program 902, based on the live player actions 924, computer-controlled player actions 926, and cards dealt, produces a game outcome 908.

Figure 10:
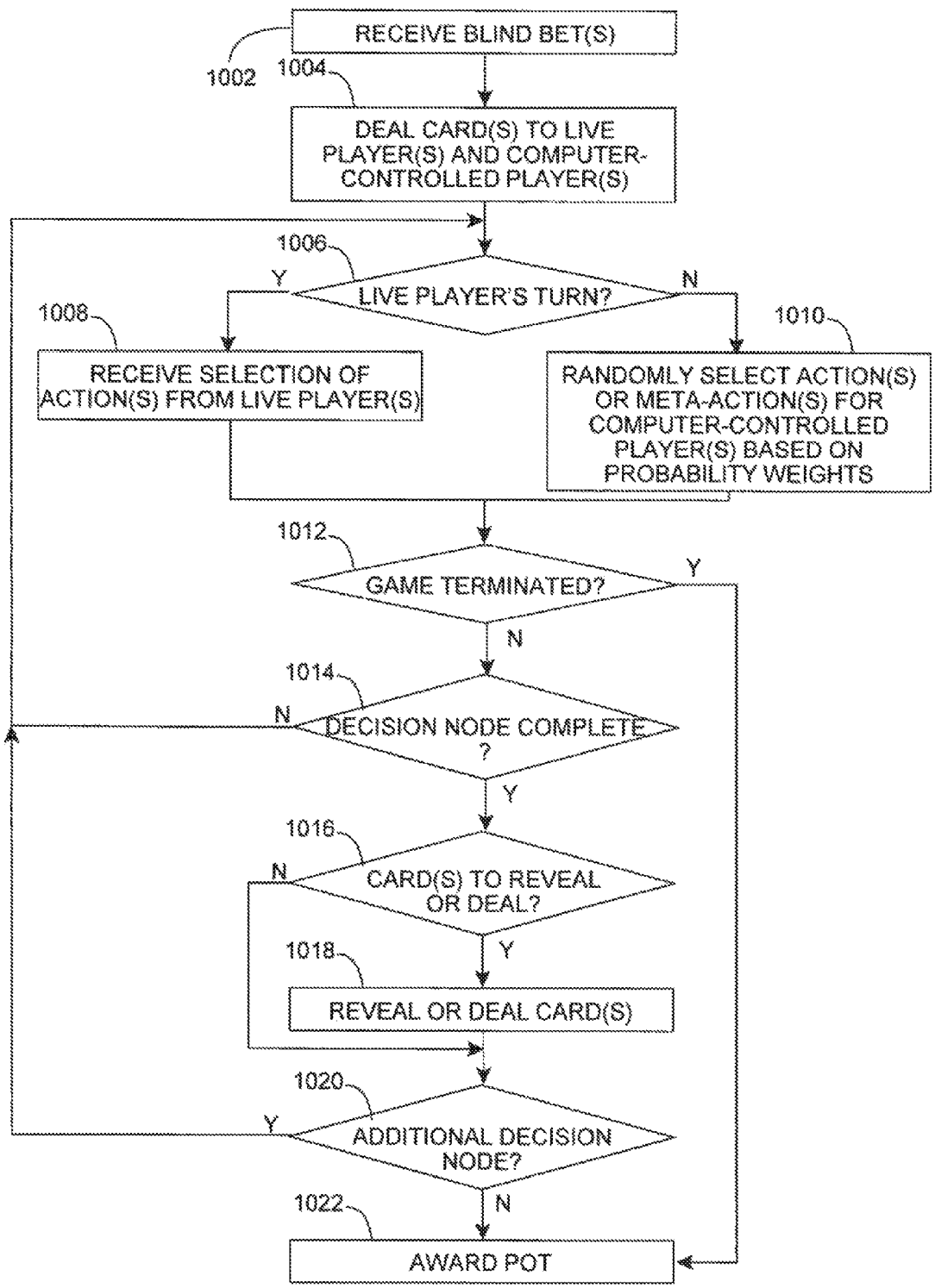
FIG. 10 is a flow chart of a method for conducting a game according to an embodiment of the present invention.

For example, in an optional embodiment shown in FIG. 10 directed to Texas Hold'em, the pot is seeded, in this example, through the receipt 1002 of at least one blind bet. As noted above, the blind bet (or blind bets) optionally rotates among the players (both live and computer-controlled) so that over the long run, the game is substantially symmetrical. Cards are dealt 1004 to the live player(s) and computer-controlled player(s). In one optional embodiment, two cards are dealt to each player (both live and computer-controlled). In this optional embodiment, a decision node is reached. If, at the decision node, it is a live player's turn 1006, an action is received 1008 from a live player; if, at the decision node, it is not a live player's turn 1006, an action is randomly selected 1010 for the computer-controlled player based, at least in part, on the probability weights generated.

In an optional embodiment, the actions may include wagering actions, such as bet, check, call, or raise. Optionally, wagers received through such wagering actions are received into a pot. It is noted that with these actions, the game state may change, thereby changing the game state input to a computer controlled player.

Additionally, in an optional embodiment, the actions may include a fold decision where the player (both live and computer-controlled) may terminate participation in the game. If all but one player folds, the game is terminated 1012 the wagers, e.g. the pot, are resolved. For example, in one optional embodiment, at least a portion of the pot is awarded to the one player (whether live or computer-controlled) who did not fold.

If the game has not terminated 1012, a determination is made whether the decision node is complete 1014. That is, in an optional embodiment, such as where the decision node constitutes a round of wagering, multiple actions may occur in a single decision node. For example, if a player (live or computer-controlled) chooses to raise a wager, the other players may have the option to call, raise, or fold in response to the raise. If the decision node is not complete 1014, additional actions are received from the players until the decision node is complete 1014.

In an optional embodiment directed to Texas Hold'em, community cards are revealed or dealt 1018 after a first round of wagering. As previously discussed, a simplified version may include revealing or dealing all community cards together, and completing the game without 1020 any additional decision nodes. In an alternate optional embodiment, the community cards are revealed or dealt in stages, with each stage separated by a decision node. In such an optional embodiment, a determination 1016 is made whether cards are to be revealed or dealt. If so, the cards are revealed or dealt 1018. For example, in an optional embodiment of Texas Hold'em, an initial round of wagering may be followed by the "flop," that is, the revealing or dealing of three community cards. After the cards are dealt or revealed, a determination 1020 is made whether an additional decision node occurs. In an optional embodiment of Texas Hold'em, the flop is followed by a decision node that is conducted similarly to the initial round of wagering. After this round of wagering, the "turn" occurs, that is, one additional community card is dealt or revealed, followed by another round of wagering. This round of wagering is followed by the "river", that is, one final community card is dealt or revealed, followed by another round of wagering. At this point, no further cards remain to be dealt or revealed, and no further decision nodes remain. The wagers are resolved, optionally by awarding 1022 at least a portion of the pot to the player with the highest ranking poker hand.

While certain embodiments of the present invention have been shown and described it is to be understood that the present invention is subject to many modifications and changes without departing from the spirit and scope of the invention presented herein.

What is claimed is:

1. A method for use by a computer system for conducting a game between at least one computer-controlled player and at least one live player comprising:
   identifying, by the system, that a decision node in the game has been reached;
   providing, by the system, a game state and a plurality of available actions to at least one neural network;
   receiving, by the system, from the neural network, a likelihood that each of the available actions will satisfy a predetermined criterion based on the game state;
   randomly selecting, by the system, one of the available actions for the computer-controlled player, wherein each of the available actions has a likelihood of being selected that is equal to the likelihood of that available action satisfying the predetermined criterion;
   taking, by the system, the selected available action with the computer-controlled player.

2. The method of claim 1 further comprising:
   identifying, by the system, one of a plurality of game states at the decision node; and
   using, by the system, a predefined probability distribution of probability weights corresponding to the identified game state for the available actions.

3. The method of claim 1 wherein the predefined criterion is a minimization of maximum loss criterion.

4. The method of claim 1 wherein the likelihood of being selected for each action is based on a probability weight generated by a neural network training program.

5. The method of claim 1 wherein the game is poker and wherein the available actions include fold, call, and raise.

6. The method of claim 5 wherein wagers are made at decision nodes during the game, and wherein the wagers are contributed to a pot.

7. The method of claim 6 wherein the plurality of inputs further includes a size of a pot.

8. The method of claim 6 further comprising determining the game outcome and distributing at least a portion of the pot is distributed to the live player if the live player wins the poker game.

9. The method of claim 1 wherein at least one of the available actions is a meta-action that represents a sequence of two or more actions.

10. The method of claim 9 wherein only a first portion of the sequence is executed at the decision node.

11. The method of claim 10 wherein a second portion of the sequence is executed at another decision node.

12. The method of claim 11 wherein execution of the second portion of the sequence at another decision node is conditional.

13. A system for conducting a game between at least one computer-controlled player and at least one live player comprising:
    a data processor;
    a data storage; and
    a plurality of instructions stored in the data storage and executable by the data processor, the instructions including;
    instructions for identifying that a decision node in the game has been reached;
    instructions for providing a game state and a plurality of available actions to at least one neural network;
    instructions for receiving, by the system, from the neural network, a likelihood that each of the available actions will satisfy a predetermined criterion based on the game state; and
    instructions for randomly selecting one of the available actions for the computer-controlled player, wherein each of the available actions has a likelihood of being selected that is equal to the likelihood of that available action satisfying the predetermined criterion.

14. The system of claim 13 wherein the game is poker, and wherein the available actions include fold, call, and raise.

15. The system of claim 14 further comprising instructions for receiving wagers at decision nodes during the game, and instructions for adding the wagers are to a pot.

16. The system of claim 15 further comprising instructions for determining a game outcome and instructions for distributing at least a portion of the pot is distributed to the live player if the live player wins the poker game.

17. The system of claim 13 further comprising:
    instructions for identifying one of a plurality of game states at the decision node; and
    instructions for using a predefined probability distribution of probability weights corresponding to the identified game state for the available actions.

18. The system of claim 17 wherein at least one of the available actions is a meta-action that represents a sequence of two or more actions.

19. The system of claim 18 wherein only a first portion of the sequence is executed at the decision node.

20. The system of claim 19 wherein a second portion of the sequence is executed at another decision node.

* * * * *